United States Patent [19]

Tury et al.

[11] Patent Number: 4,821,590

[45] Date of Patent: Apr. 18, 1989

[54] ELECTRONIC CONTROL SYSTEM FOR CONTROL OF ELECTRONIC ELECTRIC SHIFT APPARATUS FOR MANUAL TRANSMISSION

[76] Inventors: Edward L. Tury, 9732 Rosemary La., Brighton, Mich. 48116; Gregg A. Thoe, 36091 Grand River, Apartment 201, Farmington, Mich. 48024

[21] Appl. No.: 108,810

[22] Filed: Oct. 15, 1987

Related U.S. Application Data

[63] Continuation-in-part of Ser. No. 64,099, Jun. 18, 1987.

[51] Int. Cl.$^4$ ........................ B60K 20/10; F16H 5/42
[52] U.S. Cl. ................................... 74/335; 74/336 R
[58] Field of Search ............... 74/335, 336 R, 473 SW

[56] References Cited

U.S. PATENT DOCUMENTS

| | | | |
|---|---|---|---|
| 3,664,470 | 5/1972 | Beech et al. | 74/335 X |
| 3,682,013 | 8/1972 | Asbery | 74/335 |
| 4,428,248 | 1/1984 | Brouckson et al. | 74/335 |
| 4,570,502 | 2/1986 | Klatt | 74/335 |
| 4,570,765 | 2/1986 | Makita | 74/335 X |
| 4,619,151 | 10/1986 | Trachman et al. | 74/335 |
| 4,621,328 | 11/1986 | Arai et al. | 74/335 X |
| 4,732,055 | 3/1988 | Tateno et al. | 74/866 |

FOREIGN PATENT DOCUMENTS

1198501 12/1985 Canada .................................. 74/335

*Primary Examiner*—Dirk Wright
*Attorney, Agent, or Firm*—Krass & Young

[57] ABSTRACT

The present invention is an electrical control apparatus for control of a manual transmission apparatus in a motor vehicle. The transmission state is selected by clockwise or counter-clockwise motion of a shift select lever via a first motor and forward or rearward motion of the shift select lever via a second motor. The electrical control apparatus includes first set of microswitches for indicating the left, center, right location of the shift select lever, and a second set of microswitches for indicating the forward, neutral or rearward location of the shift select lever. A logic control unit generates a sequence of motor drive signals corresponding to the sequence of motions required for movement of the shift select lever from the present transmission state to the desired transmission state. The control apparatus also includes a motor drive circuit for controlling the first and second motors in response the sequence of drive signals.

14 Claims, 6 Drawing Sheets

ELECTRONIC CONTROL SYSTEM FOR CONTROL OF ELECTRONIC ELECTRIC SHIFT APPARATUS FOR MANUAL TRANSMISSION

CROSS-REFERENCE TO RELATED APPLICATION

The present application is a continuation-in-part of U.S. patent application Ser. No. 64,099 filed June 18, 1987.

BACKGROUND OF THE INVENTION

This invention relates to an electronic system for control of an electric shift apparatus especially suited for use with a motor vehicle having a manual transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmissions however are typically relatively expensive and inherently involve a fuel economy penalty as compared to manual transmissions. Various attempts have been made in the past to combine the low cost and superior fuel economy aspects of a manual transmission with the convenience aspects of an automatic transmission, and, specifically, various attempts have been made to provide automatic or semi-automatic shifting for manual transmissions. However, none of these prior art attempts to facilitate and simplify the shifting of a manual transmission have met with any degree of commercial success since they provided a slow or imprecise shifting action and/or have generated excessive warranty and maintenance costs.

SUMMARY OF THE INVENTION

This invention is directed to the provision of electronic control of an electric shift apparatus for a manual transmission of a motor vehicle which provides positive and precise shifting, which is amenable to ready installation in the motor vehicle at the time of the original motor vehicle manufacture, and which is reliable in operation even over a long motor vehicle life.

The invention electronic control apparatus is intended for use with a manual transmission of the type including a plurality of forward speeds, a reverse position, and a neutral position. The invention apparatus includes a gear selector assembly adapted to be positioned in the passenger compartment of the vehicle and including gear selector means having a separate select position corresponding to each position of the transmission and operative in response to operator selection to generate a plurality of electrical gear select signals respectively corresponding to each position of the transmission. The electronic control apparatus generates a proper sequence of motor control signals in order to shift into the transmission position corresponding to the received gear select signal. This arrangement is amenable to ready installation in the motor vehicle at the time of original motor vehicle assembly and provides Positive and reliable shifting of the manual transmission in response to operator selection of a particular desired gear position.

According to a further feature of the present invention the apparatus further includes a first set of transmission state sensing devices which indicate the left, center or right location of the shift select lever and a second set of transmission state sensing devices for indicating the forward, neutral or rearward location of the shift select lever. The logic control unit receives the signals from the first and second transmission state sensing devices, determines the present transmission state, and compares this present transmission state to the desired transmission state. In the event that the desired transmission state differs from the present transmission state, the logic control unit generates motor control signals selected from the set including a clockwise motor drive signal, a counterclockwise motor drive signal, a shift up motor drive signal and a shift down motor drive signal. A motor drive device is responsive to these signals for controlling the first motor for clockwise motion in response to the clockwise motor drive signal and for counter-clockwise motion in response to the counterclockwise motor drive signal and for controlling the second motor for forward motion in response to the shift up motor drive signal and rearward motion in response to the shift down motor drive signal.

According to a still further feature of the present invention, the electrical control apparatus includes a vehicle condition sensing apparatus which senses the condition of the vehicle and generates a plurality of vehicle condition signals. The logic control unit is further responsive to these vehicle condition signals for inhibiting the generation of any of the motor control signals when the vehicle condition signals correspond to one of a set of unsafe circumstances. In accordance with the preferred embodiment of the present invention the vehicle condition sensing circuits include a manner for detecting the depression of the clutch pedal. The logic control unit inhibits the generation of any of the motor drive signals when the clutch pedal is not depressed. In a further feature of the preferred embodiment of the present invention, the vehicle condition sensing circuits include means for sensing the speed of the motor vehicle. Further the logic control unit inhibits the generation of any of the motor drive signals when the indicated vehicle speed is greater than a predetermined motor vehicle speed corresponding to the desired transmission state signal. In the preferred embodiment a comparitor circuit generates a set of vehicle speed signals, each vehicle speed signal indicating when the motor vehicle speed exceeds a corresponding predetermined speed.

According to a still further feature of the present invention, the first and second transmission state sensing devices include a plurality of micro switches. In addition, the shift select lever can be placed in a position in which the actuated micro switches do not unambiguously indicate the shift lever position. The logic control unit further includes some manner of feedback which continues the generation of a motor control signal upon initial generation of that motor control signal even when movement of the shift select lever places it in a position where either the first transmission state sensing device or the second transmission state sensing device generates a signal from its respective micro switches.

According to a still further feature of the present invention, the apparatus includes a timer which inhibits the generation of any of the motor drive signals when the desired transmission state differs from the present transmission state for more than a predetermined period of time.

According to a further feature of the present invention, the logic control unit includes a manner for breaking the two motors when the desired transmission state corresponds to the current transmission state.

DETAILED DESCRIPTION OF THE PREFERRED EMBODIMENT

Figure 1:
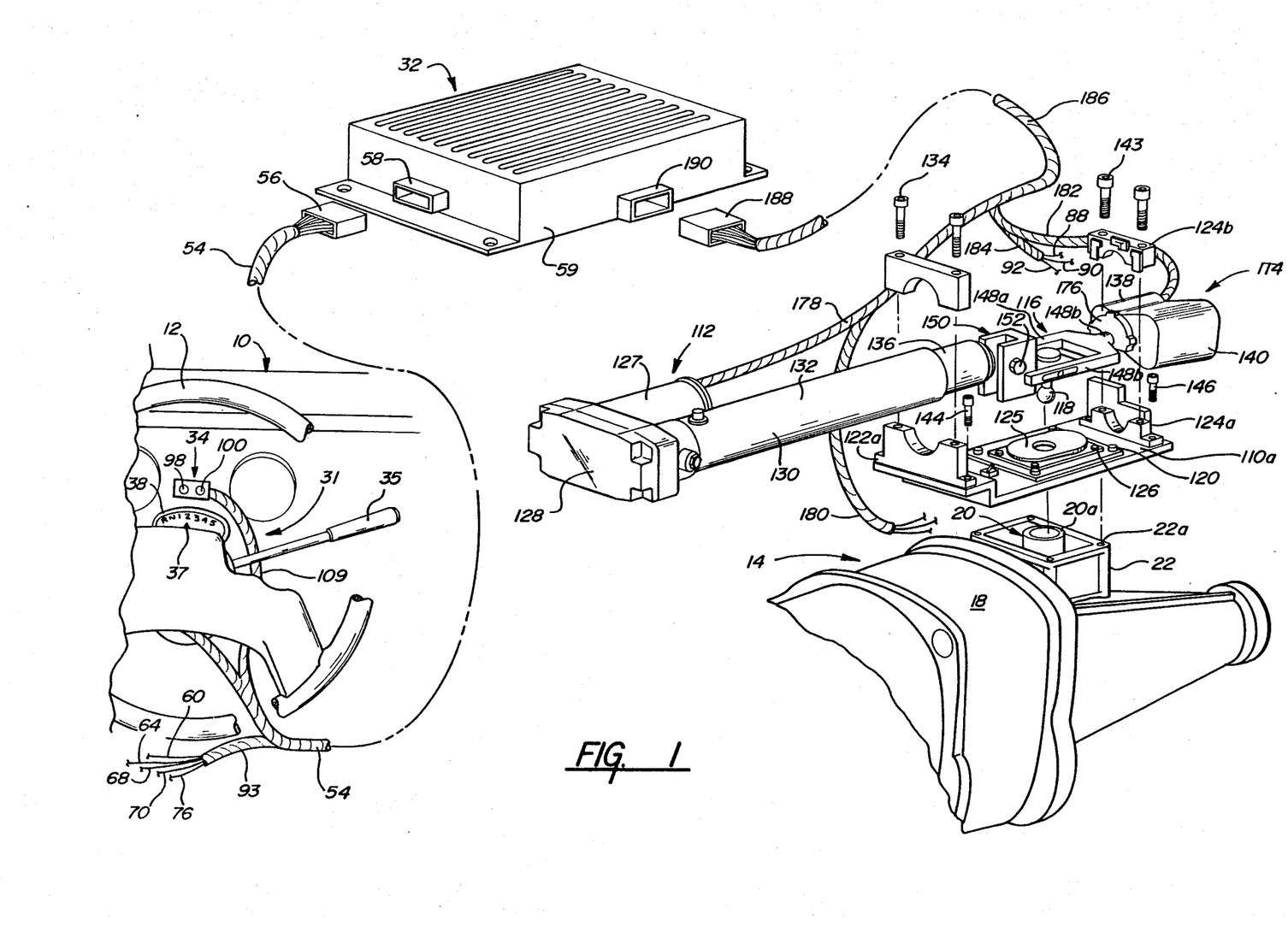
FIG. 1 is a fragmentary perspective view of an electric shift apparatus employed in the invention.
Figures 2, 3, 4, 5, 6:
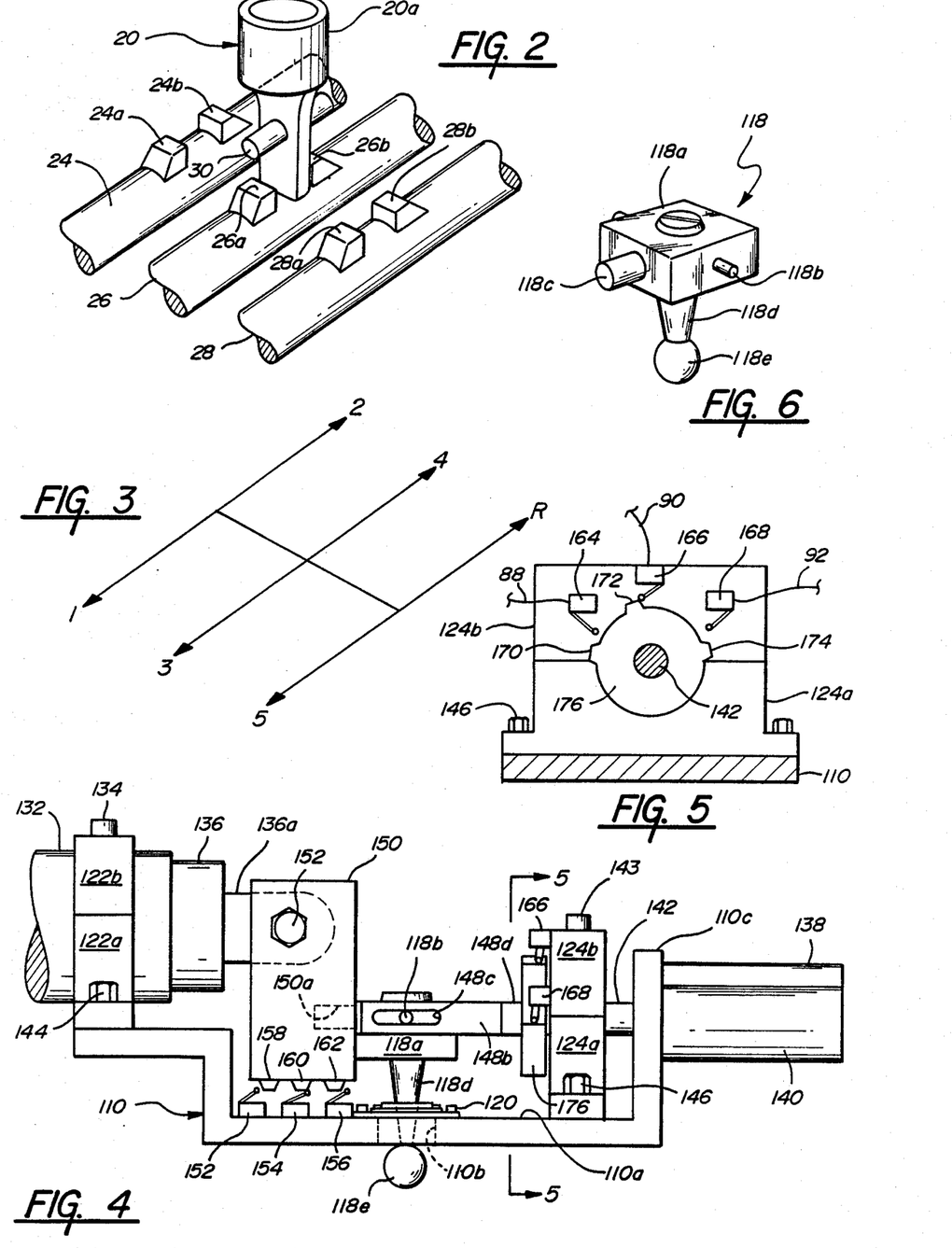
FIG. 2 is a fragmentary perspective view showing the basic internal operation of the manual transmission seen in FIG. 1.
FIG. 3 is a diagrammatic view showing the gating of the transmission.
FIG. 4 is a fragmentary side elevational view showing an electric power module employed in the electric shift apparatus of FIG. 1.
FIG. 5 is a cross-sectional view taken on line 5—5 of FIG. 4.
FIG. 6 is a perspective view of a drive link employed in the invention shift apparatus.

The invention electronic control apparatus is seen schematically in FIG. 1 in association with a motor vehicle of the type including an instrument panel assembly 10 positioned within the passenger compartment of the motor vehicle; a steering wheel 12 associated with the instrument panel; and a manual transmission assembly 14 including a clutch housing 16 and a transmission housing 18. The transmission 14 includes a mode select lever 20 positioned in a tower 22 and, as seen in FIG. 2, engagable at its lower end with a plurality of shift rails 24, 26, 28 each having a forward, neutral, and rearward position. Mode select lever 20 is mounted on a shaft 30 with in the transmission for pivotal or crossover movement between rails 24, 26 and 28 to selectively move into driving relationship with spaced drive lugs 24a, 24b, 26a, 26b and 28a, 28b on the shift rails 24, 26 and 28 so as to be selectively drivably engaged with the shift rails. Lever 20 is also mounted for axial movement so as to move the engaged shift rails axially between its forward, neutral, and rearward positions. As seen in FIG. 3, mode select lever 20 is thus capable, by a combination of crossover and axial movements, to move shift rails 24, 26 and 28 forwardly and rearwardly to achieve five forward speeds and one reverse speed. Specifically, first and second speeds may be achieved by axial forward and rearward movement of rail 24; third and fourth speeds may be achieved by axial forward and rearward movement of rail 26, and fifth speed and reverse may be achieved by axial forward and rearward movement of rail 28.

The invention electric shift apparatus includes a gear selector assembly 31, a control module 32, a power module 33, and an instrument panel module 34. Broadly considered, gear selector assembly 31 is adapted to be positioned in association with the steering column assembly of the motor vehicle; power module 33 is adapted to be bolted to the housing of the transmission; and instrument panel module 34 is adapted to be mounted in the instrument panel of the motor vehicle.

Figure 7:
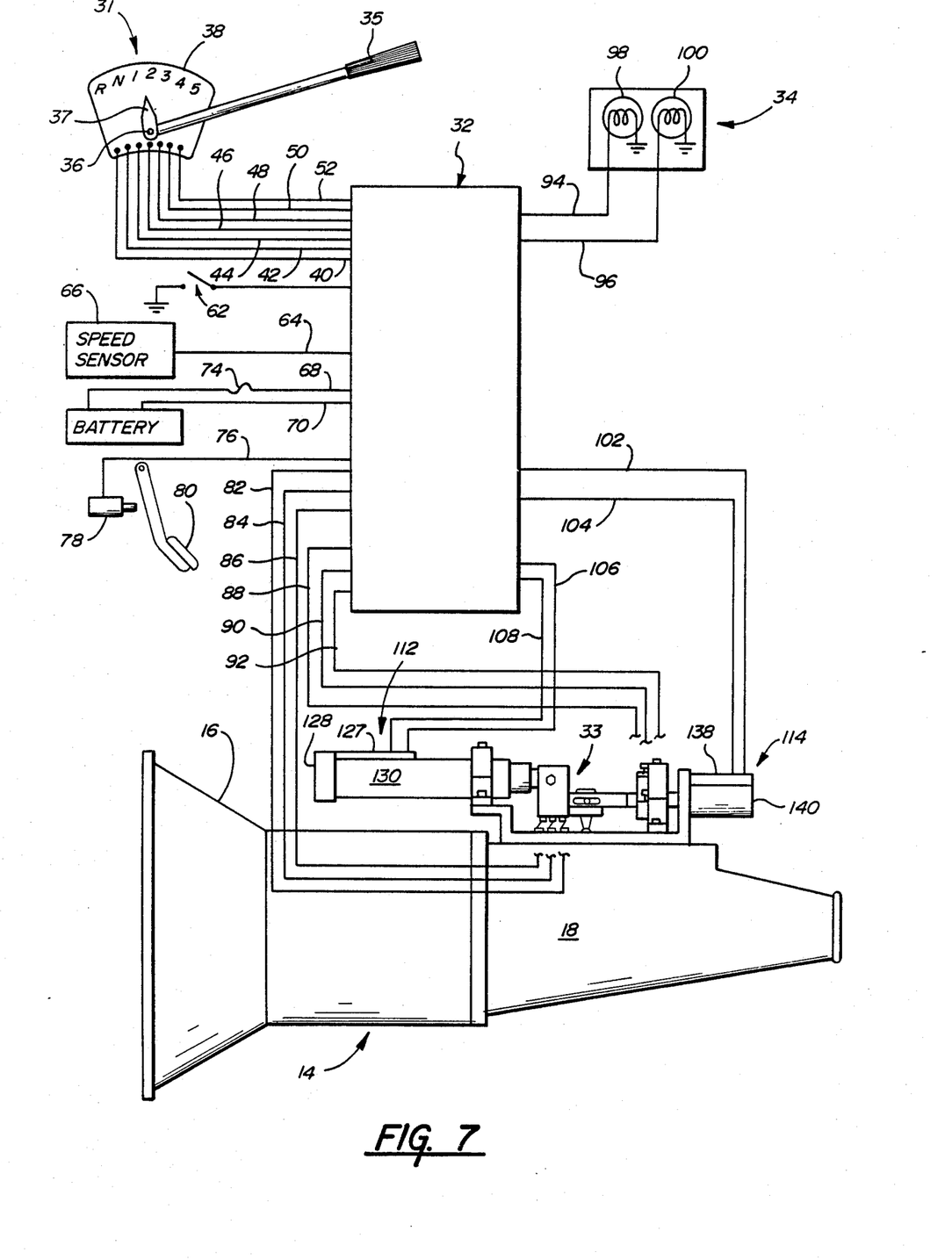
FIG. 7 is a diagram illustrating the electrical connections between the invention electronic control apparatus and the other parts of the electric shift apparatus.

Gear selector assembly 31 includes a gear selector lever 35 mounted for pivotal movement about end 36 and including a pointer 37; a quadrant member 38 carrying suitable indicia such as R, N, 1, 2, 3, 4, 5 corresponding to the positions of the associated transmission; and a plurality of leads 40, 42, 44, 46, 48, 50 and 52 respectively associated with each of the quadrant positions R, N, 1, 2, 3, 4, 5 and respectively representing circuits that are completed in response to movement of the selector lever 35 to a respective position so that leads 40–52 respectively carry control signals respectively generated in response to movement of selector lever 35 through the various indicated positions. Leads 40-52 may for example be embodied in a single cable 54 extending from quadrant member 38 to control module 32 and terminating in a suitable plug 56 for plugging receipt in a socket 58 in the housing 59 of the control module.

Other input leads to control module 32 include a lead 60 associated with the ignition switch 62 of the motor vehicle; a lead 64 connected to the existing speed sensor 66 of the motor vehicle; leads 68 and 70 connected to the negative and positive terminals of the battery 72 of the vehicle and including a fuse 74; a lead 76 associated with a switch 78 adapted to be actuated in response to operator depression of the clutch pedal 80 of the vehicle; and a plurality of position indicator leads 82, 84, 86, 88, 90 and 92. Leads 60, 64, 68, 70 and 76 are embodied in a cable 93 which is bundled into cable 54 so as to be connectable to control module 32 via plug 56 and socket 58.

Output leads from control module 32 include leads 94 and 96 associated respectively with electric bulbs 98 and 100 embodied in instrument panel module 34, and power leads 102, 104, 106 and 108 associated with power module 33. Leads 94 and 96 are embodied in a cable 109 which is bundled into cable 54 so as to be connectable to control module 32 via plug 56 and socket 58.

Power module 33 includes a bracket 110; a linear motor assembly 112; an angular motor assembly 114; a joint mechanism 116; and a drive link 118. Bracket 110 is adapted to be secured to the upper face of transmission tower 22 by a plurality of bolts 120 passing downwardly through suitable holes in the bracket for threaded receipt in threaded bores 22a in tower 22. A first bearing block assembly 122a, 122b is secured to the front end of bracket 110, a second bearing block assembly 124a, 124b is secured to the rear end of the bracket, and an elastomeric boot 125 is secured to the upper face 110a of the bracket in overlying relation to an aperture 110b in the bracket by a plurality of screws 126.

Linear motor assembly 112 may be of the type, for example, available from Saginaw Division of General Motors Corporation as Model HiTec 90. Assembly 112 includes at electric motor 127 connected to output leads 106, 108 from control module 32, a gear reduction unit 128 driven by motor 127, and a ball screw assembly 130 driven by gear reduction unit 128. Ball screw assembly 130 includes an outer tube 132, clamped between the upper and lower bearing block halves 122a, 122b by bolts 134, and an inner tube or nut 136 which is advanced or retracted linearly and in known manner in response to energization of motor 127.

Angular motor assembly 114 includes an electric DC motor 138 connected to output leads 102, 104 from control module 32, and a speed reduction unit 140 driven by motor 138 and having an output shaft 142. Assembly 114 may for example comprise a unit available from Buhler Products Inc. of Raleigh, N.C. as part no. 61.42.322. Output shaft 142 of motor assembly 114 is received within the upper and lower bearing block halves 124a, 124b with a suitable bushing (not shown) positioned between the faces of the bearing block halves and the shaft 142 to firmly position shaft 142 within the bearing block but allow rotational movement of the shaft within the bearing block. Bolts 143 secure bearing block half 124a to bearing block half 124b. Motor assembly 114 is mounted in suitable fashion on an upstanding flange portion 110c at the rear end of bracket 110, and bearing block assembly 122 and 124 are suitably secured to the front and rear ends, respectively, of bracket 110 by bolts 144 and 146.

Joint mechanism 116 includes a fork member 148, including left and right fork arms 148a and 148b defining axially extending slots 148c, and a journal member 150. Journal member 150 is suitably secured as by a bolt 152 to the flattened end portion 136a of nut 136 and includes a blind bore 150a opening in its rear face 150b. Fork member 148 further includes a central shaft portion 148d forming a forward extension of the output shaft 142 of speed reduction unit 140.

Drive link 118 includes a monolithic main body portion 118a sized to fit slidably between fork arms 148a and 148b, diametrically opposed and laterally extending pin portions 118b, a forwardly extending journal portion 118c, a downwardly extending stem portion 118d, and a ball joint portion 118e. Drive link 118 is mounted in joint mechanism 116 with pin portions 118b guiding in slots 148c, journal portion 118c journaling in blind bore 150a of journal member 150, and stem portion 118d extending downwardly through boot 125 to dispose ball joint portion 118a in a position for coaction with transmission select lever 20.

A plurality of limit switches 152, 154 and 156 are disposed on the upper face 110a of bracket 110 for coaction with cam lobes 158, 160 and 162 on the underface of journal member 150, and a further plurality of limit switches 164, 166 and 168 are positioned on upper bearing block half 124b for respective coaction with cam lobes 170, 172 and 174 provided at angularly spaced locations on a cam 176 secured to the output shaft 142 of speed reduction unit 140. Input leads 82, 84, and 86 to control module 32 are respectively connected to limit switches 152, 154 and 156, and input leads 88, 90 and 92 to control module 32 are respectively connected to limit switches 164, 166 and 168. Limit switches 152, 154 and 156 establish a forward, neutral, and rearward position for journal member 150 and are respectively spaced by amounts calibrated to move shift link 118 and thereby selector lever 120 by axial amounts necessary to move rails 24, 26 and 28 between their forward, neutral and rearward positions. For example, limit switches 152, 154 and 156 may be positioned to allow 10 millimeters of axial movement between each limit switch position and a total of 20 millimeters of axial movement between the forward and rearward positions of journal member 150. Similarly, limit switches 164, 166 and 168 establish left, center, and right angular positions of shaft 142 and are respectively spaced by angular amounts calibrated to move shift lever 118 and thereby mode select lever 20 by angular amounts necessary to move lever 20 angularly into respective driving relationship with rails 24, 26 and 28. For example, limit switches 164, 166 and 168 may be spaced to allow 19 degrees of angular movement between each limit switch position and a total of 38 degrees of angular movement between the extreme left and right positions of lever 118.

Motor leads 106 and 108 are contained in a cable 178; limit switch leads 82, 84 and 86 are contained in a cable 180; motor lead 102 and 104 are contained in a cable 182; limit switch leads 88, 90 and 92 are contained in the cable 184; and cables 178, 180, 182 and 184 are bundled together to form a cable 186 which terminates in a plug 188 for coaction with a socket 190 in housing 50 of control module 32.

The invention electric shift apparatus is installed in the associated motor vehicle during the original motor vehicle assembly process. Specifically, gear selector assembly 31 is assembled in association with the steering column assembly of the motor vehicle in much the same manner as the present automatic transmission controls are provided in association with the vehicular steering column; instrument panel module 34 is mounted in the instrument panel of the vehicle in proximity to quadrant 38 of gear selector assembly 31; control module 32 is mounted in the passenger compartment of the vehicle, preferably behind the front face of the instrument panel of the vehicle; power module 33 is secured to the housing of the vehicle transmission by the use of bolts 120 with the spherical end 118e of drive link 118 drivingly positioned in the hollow socket upper end 20a of mode select lever 20; plugs 56 and 188 are inserted into sockets 58 and 190 respectively of the housing 59 of control module 32; and leads 60, 64, 68, 70 and 76 embodied in cable 93 are respectively connected to the vehicle ignition, the vehicle speed sensor, the vehicle battery, and the clutch disengage switch. The system is now operational.

In use, it will be seen that limit switches 152, 154 and 156 provide a constant indication of the linear position of journal member 150, and thereby a constant indication of the linear or shift position of select lever 20, and limit switches 164, 166 and 168 provide a constant indication of the angular position of shaft 142 and thereby the angular or crossover position of select lever 20 so that the two position readings from the two sets of limit switches, taken together, provide an accurate and constant indication of the shift position of the transmission. Simultaneously, leads 40–52 provide a constant indication of the transmission position selected by the operator by appropriate positioning of shift lever 35; lead 60 provides a constant indication of the open or closed position of the vehicle ignition; lead 64 provides a constant signal representative of the instantaneous speed of the vehicle; leads 68 and 70 provide battery power for the system; and lead 76 provides an indication of the engagement or disengagement of the clutch.

Figure 8:
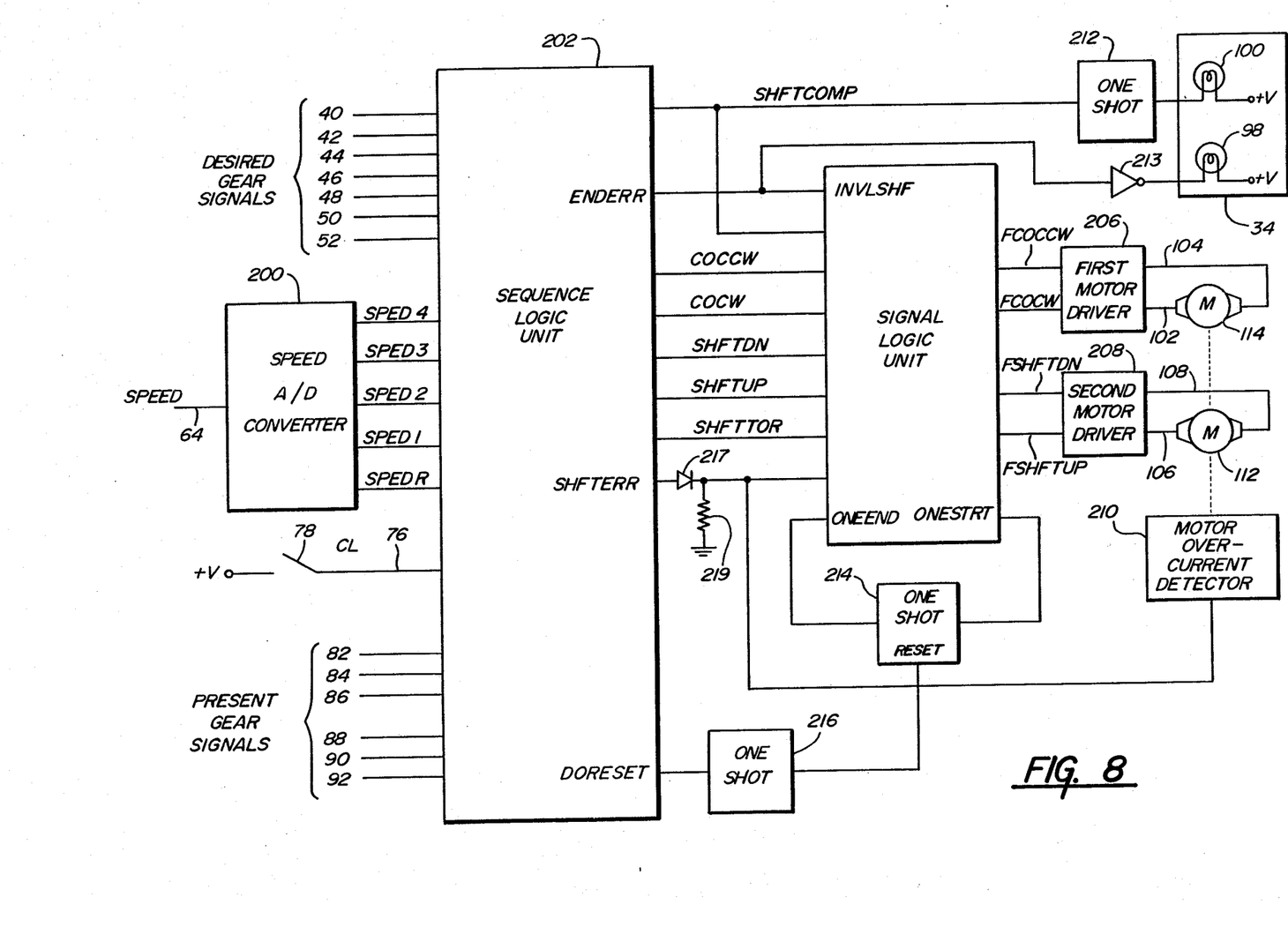
FIG. 8 is an electrical schematic diagram of the invention electrical control apparatus.

FIG. 8 illustrates a schematic block diagram of the electrical control system of the present invention. This block diagram includes speed analog-to-digital converter 200, sequence logic unit 202, signal logic unit 204, first motor driver circuit 206, second motor driver circuit 208, motor overcurrent detector 210, one shot devices 212, 214 and 216, inverter 213, diode 217 and resistor 219. FIG. 8 further illustrates the previously described invalid shift lamp 98, the shift complete lamp 100, linear motor assembly 112 and angular motor assembly 114.

FIG. 8 illustrates the application of signals to logic control unit 202. Lines 40, 42, 44, 46, 48, 50 and 52 constitute the desired gear signals. Clutch switch 78 is connected to logic control unit 202 via line 76. Lastly, lines 82, 84, 86, 88, 90 and 92 constitute the present gear signals from the microswitches 152, 154, 156, 164, 166 and 168, respectively.

Speed analog-to-digital converter 200 receives an analog signal indicative of speed on line 64. Speed analog-to-digital converter 200 generates an output signal on one or more of the output lines SPEDR, SPED1, SPED2, SPED3 or SPED4, depending upon the magnitude of the analog speed signal.

Figure 9:
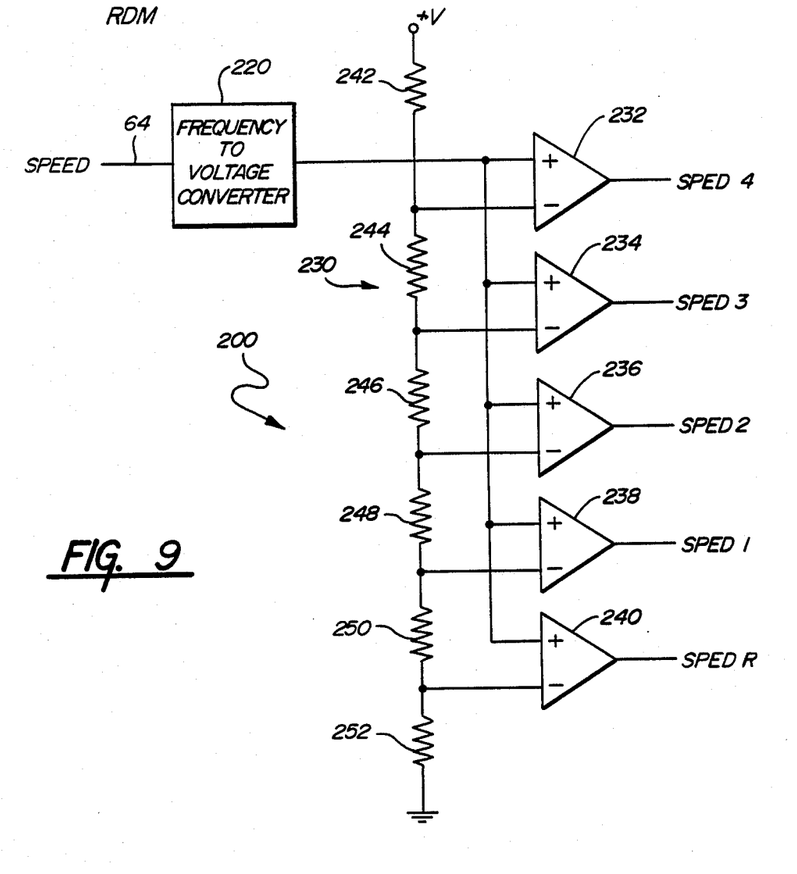
FIG. 9 is a detailed schematic diagram of the speed analog-to-digital converter.

FIG. 9 illustrates in schematic form the preferred construction of speed analog-to-digital converter 202. The speed signal is applied to a frequency to voltage converter 220 and then to the positive input of each of a set of comparitors 232, 234, 236, 238 and 240. A voltage divider circuit 230 comprising resistors 242, 244, 246, 248, 250 and 252 is connected between the positive supply voltage and ground. The node between resistors 242 and 244 is connected to the negative input of comparitor 232; the node between resistors 244 and 246 is connected to the negative input of comparitor 234; the node between resistors 246 and 248 is connected to the negative input of comparitor 236; the node between resistors 248 and 250 is connected to the negative input of comparitor 238; and the node between resistors 250 and 252 is connected to the negative input of comparitor 240. Each of these comparitor circuits 232 to 240 receives a reference voltage for comparison to the output from frequency to voltage converter 210 is greater than the reference voltage applied to comparitor 232, this indicates a vehicle speed of greater than the predetermined maximum speed for fourth gear. Accordingly, the output of comparitor 232 is the SPED4 signal. Similarly, comparitor 234 generates a signal at output SPED3 when the voltage at the output of buffer 210 indicates a vehicle speed of greater than the predetermined maximum speed for third gear. Comparitor 236 generates an output SPED2 when the input indicates a vehicle speed of greater than the predetermined maximum speed for second gear. Comparitor 238 generates an output SPED1 when the input indicates a vehicle speed greater than the predetermined maximum speed for first gear. Lastly, comparitor 240 generates an output SPEDR when the speed input signal indicates a vehicle speed of greater than the predetermined maximum speed for reverse gear. Each of these five digital speed signals are supplied to sequence logic unit 202, to be used in a manner which will be further disclosed below.

Instrument panel module 34 is connected to sequence logic unit 202 via lines 94 and 96. As previously illustrated, instrument panel module 34 includes indicator lamps 98 and 100.

Sequence logic unit 202 receives the above described input signals and generated four primary output signals. These include the clockwise motor drive signal (COCW) and the counter clockwise motor drive signal (COCCW), the shift up motor drive signal (SHFTUP) and the shift down motor drive signal (SHFTDN). These primary output signals from sequence logic unit 202 are supplied to signal logic unit 204 for additional signal conditioning. In addition sequence logic unit 202 generates several secondary signals. The SHFTCOMP signal (indicating that a commanded shift operation is complete) is supplied to signal logic unit 204 as well as to a one shot circuit 212 for control of shift complete lamp 100 in instrument panel module 34. Sequence logic unit 202 also supplies a signal SHFTTOR to signal logic unit 204 indicating that the desired gear is reverse gear. Sequence logic unit 202 generates the SHFTERR signal, which indicates an error in the shift operation. This signal is supplied to signal logic unit 204 in a wired OR configuration via diode 217 and resistor 219 together with the output from the motor overcurrent detector 210. Sequence logic unit generates the DORESET signal which is controls a one shot employed with signal logic unit 204 in a manner which will be further described below.

Signal logic unit 204 is responsive to the primary signals generated by sequence logic unit 202. In COCW, COCCW, SHFTDN and SHFTUP, signal logic unit supplies the drive signals FCOCW and FCOCCW to first motor driver 206 and the drive signals FSHFTDN and FSHFTUP to second motor driver 208. Signal logic unit 204 applies additional logic conditioning to the primary signals supplied from sequence logic unit 202. Signal logic unit 204 receives the SHFTERR signal from sequence logic unit 202. This signal generated by sequence logic unit 202 is ORed with the output of motor overcurrent detector 210. The SHFTERR signal is employed in generation of the drive signals. Signal logic unit 204 further generates an INVALSHF signal indicating an invalid shift operation is requested. This INVALSHF signal is supplied to sequence logic unit 202 as the ENDERR signal and is further connected to inverter 213 to control invalid shift lamp 98 within instrument panel module 34. Lastly, signal logic unit 204 generates a one shot start signal ONESTRT to one shot circuit 214 and receives the one shot signal as the input signal ONEEND. The operation of the present invention with regard to these signals will be detailed below.

In use various input signals, such as described above and illustrated in FIGS. 7 and 8, are supplied to sequence logic unit 202. Sequence logic unit 202 is configured to receive these input signals and generate the necessary sequence of signals for driving motor 114 and motor 112 for providing the selection of the desired gear. Additional signal conditioning and control lock outs are performed by signal logic unit 204, which supplies the required signals to the first motor driver 206 and the second motor driver 208. Sequence logic unit 202 and signal logic unit 204 could be constructed using programmed microprocessor devices. However, it is believed preferable to construct these units in hardware logic in a programmable logic array or a gate array. There are several reasons for this. Firstly, there is no need to write and maintain software for the microprocessor if the logic is embodied in hardware. Secondly, this technique is believed cheaper. The following description of the action of sequence logic unit 202 and signal logic unit 204 is made in relation to Boolean equations which can be embodied in the logic circuits of a programmable logic array or gate array. Those skilled in the art would understand that it is equally possible to perform the same Boolean operations with a programmable microprocessor device.

The various input signals are formed into a set of logic signals. These logic signals include a set of signals whose state is selected by the gear selector assembly 31; STR, STN, ST1, ST2, ST3, ST4 and ST5. In accordance with the preferred embodiment, control module 32 employs active low logic inputs. Thus one of these input signals, corresponding to the desired gear selected by the gear selector 31 is a logic "0" while the other of these signals is a logic "1."

Signals from limit switches 152, 154 and 156 permit generation of a set of logic signals SH1, SHN and SH2. At any time only one of these signals may be an active "0" to indicate the present forward (SH1), neutral (SHN) or rearward (SH2) position of drive link 118. Signals from limit switches 164, 166 and 168 Permit generation of a set of logic signals CO12, CO34, and CO5R. One of these signals is an active "0" to indicate the present left (CO12), middle (CO34) or right (CO5R) position of drive link 118. These six signals indicate the particular gear presently engaged. This indication of the gear is shown in Table 1.

TABLE 1

|  | CO12 | CO34 | CO5R |
|---|---|---|---|
| SH1 | 1 | 3 | 5 |
| SHN | N | N | N |
| SH2 | 2 | 4 | R |

Note that in certain circumstances during shifting it is possible that only one of the limit switches 152, 154, 156, 164, 166 and 168 are closed. Therefore it is possible that at certain periods the signals SH1, SHN, SH2, CO12, CO34 or CO5R will be ambiguous regarding the position of the shift lever.

The speed sensor input signal is formed into five logic signals: SPEDR indicating the greatest speed permitted for entering reverse; SPED1 indicating the greatest speed permitted for entering first gear; SPED2 indicating the greatest speed permitted for entering second gear; SPED3 indicating the greatest speed permitted for entering third gear; and SPED4 indicating the greatest speed permitted for entering fourth gear. Each of these signals is an active "1" if its condition is satisfied and inactive if not. Note that these signals are cumulative; if the speed is over the speed of SPED4 then all will be active. The logic signal CL="1" indicates the clutch is disengaged.

Control module 32 serves to compare the inputs indicating the gear selected with the inputs indicating the present gear. If they differ, then control module 32 generates the required sequence of intermediate output signals for proper control of linear motor assembly 112 and angular motor assembly 114 until the present gear matches the selected gear. Four signals of this type are produced by sequence logic unit 202: COCW or crossover clockwise for causing angular motor assembly 114 to rotate to the right; COCCW or crossover counter clockwise for causing angular motor assembly 114 to rotate to the left; SHFTDN or shift down for causing linear motor assembly 112 to pull downward toward second, fourth and reverse gears; and SHFTUP or shift up for causing linear motor assembly 112 to push upward toward first, third and fifth gears.

Various intermediate signals are employed in the production of the four primary drive signals listed above. These intermediate signals are as follows. Signal 3THRUR indicates that one of the gears third, fourth, fifth or reverse has been selected by gear selector 31. It is formed by the Boolean equation:

3THRUR = Not(ST3) or Not(ST4) or Not(ST5) or Not(STR)

Because of the active low logic convention for the inputs 3THRUR is a "0" only if one of these gears is selected. Similarly 1THRU4 indicates that one of the gears first, second, third or fourth has been selected by gear selector 31. It is formed by the Boolean equation:

1THRU4 = Not(ST1) or Not(ST2) or Not(ST3) or Not(ST4)

The signals ST13OR5 and ST24ORR each indicate a set of gears. The signal ST13OR5 indicates that one of first, third or fifth gears has been selected The signal ST24ORR indicates that one of second, fourth or reverse gears has been selected. These signals are formed as follows:

ST13OR5 = Not(ST1) or Not(ST3) or Not(ST5)

ST24ORR = Not(ST2) or Not(ST4) or Not(STR)

The signal GEAROK indicates if the gear selected is appropriate for the current speed. This signal is formed by the Boolean equation:

GEAROK = (Not(ST1) and Not(SPED1)) or
 (Not(ST2) and Not(SPED2)) or
 (Not(ST3) and Not(SPED3)) or
 (Not(ST4) and Not(SPED4)) or
 Not(ST5) or
 Not(STN) or
 (Not(STR) and Not(SPEDR))

The signal GEAROK is an active "1" when the selected gear is within the predetermined speed limit set to prevent overreving the engine. Note that no such engine protection is required when going to fifth gear or neutral. A similar but inverse signal SHFTERR is formed as follows:

SHFTERR = (Not(ST1) and SPED1 and Not(SHFTCOMP)) or
 (Not(ST2) and SPED2 and Not(SHFTCOMP)) or
 (Not(ST3) and SPED3 and Not(SHFTCOMP)) or
 (Not(ST4) and SPED4 and Not(SHFTCOMP)) or
 (Not(STR) and SPEDR and Not(SHFTCOMP))

This SHFTERR signal is hardwire ORed with the output of motor overcurrent detector 210 in the preferred embodiment of the present invention. This ORed signal is supplied to signal logic unit 204. In accordance with the preferred embodiment motor overcurrent detector 210 generates an output signal when the current flowing through either linear motor assembly 112 or angular motor assembly 114 exceeds a corresponding predetermined threshold level. In the preferred embodiment the current flowing in these motors is detected via a Hall effect sensor and compared with a corresponding threshold level.

The signal PULLDOWN indicates that a shift requiring a downward motion of linear motor assembly 112 is required. This signal is formed as follows:

PULLDOWN = (Not(CO12) and ST1) or
 (Not(CO34) and ST3) or
 (Not(CO5R) and ST5)

Thus PULLDOWN is an active "1" when (a) the drive link 118 is in the gate with first and second gears and first gear is not selected, or (b) the drive link 118 is in the gate with third and fourth gears and third gear is not selected, or (c) the drive link 118 is in the gate with fifth and reverse gears and fifth gear is not selected. The signal RETNEUT (for return to neutral) is formed of two other intermediate signals ENDERR and SHFTCOMP. The signal ENDERR is a timing signal which is an active "1" for a predetermined period of time after the beginning of a shift. This signal is generated by signal logic unit 204 in a manner which will be detailed below. The signal SHFTCOMP indicates when a shift is complete and is formed by the following equation:

```
SHFTCOMP = (Not(SHN) and Not(STN))
        or (Not(SH2) and Not(CO12) and Not(ST2))
        or (Not(SH2) and Not(CO34) and Not(ST4))
        or (Not(SH2) and Not(CO5R) and Not(STR))
        or (Not(SH1) and Not(CO12) and Not(ST1))
        or (Not(SH1) and Not(CO34) and Not(ST3))
        or (Not(SH1) and Not(CO5R) and Not(ST5))
```

The signal RETNEUT is employed to indicate a missed shift and to require the drive link 118 return to the neutral position. This signal is formed as follows:

```
RETNEUT = (Not(SHFTCOMP) and ENDERR and
            SHFTINPG and SH1 and SH2 and SHN)
        or (Not(SHFTCOMP) and Not(CL) and
            SH1 and SHN and SH2)
        or (CL and SH1 and SH2 and SHN and
            Not(SHFTDN) and Not(SHFTUP))
        or (RETNEUT and SH1 and SHN and SH2))
```

Thus RETNEUT indicates: (1) when the shift is not complete, the predetermined length of ENDERR has passed, a shift is in progress and the drive link 118 is between positions of the limit switches 152, 154 and 156; (2) when the shift is not complete, the clutch is engaged and the drive link 118 is between positions of the limit switches 152, 154 and 156; (3) the clutch is engaged, the drive link 118 is between positions of the limit switches 152, 154 and 156, and neither SHFTDN nor SHFTUP were previously generated; or (4) RETNEUT was previously generated and the drive link 118 is between positions of the limit switches 152, 154 and 156. These conditions indicate a missed shift. A last of these intermediate signals HLDNEUT is a feedback signal which is used to keep the linear motor assembly 112 running when leaving a gear until a valid neutral signal (SHN) is received. It is formed by the following Boolean equation:

HLDNEUT = Not(SH1) or (HLDNEUT and SHN) or Not(SH2)

Two other signals are generated by sequence logic unit 202 for use in other circuits. The signal SHFTINPG, indicating a shift is in progress is formed as follows:

SHFTINPG = Not(SHFTCOMP) and CL

The signal DORESET is formed from TRGRST as follows:

```
TRGRST = (Not(ST1) and SHFTERR) or
        (Not(ST2) and SHFTERR) or
        (Not(ST3) and SHFTERR) or
        (Not(ST4) and SHFTERR) or
        (Not(ST5) and SHFTERR) or
        (Not(STN) and SHFTERR) or
        (Not(STR) and SHFTERR) or
        SHFTCOMP
DORESET = TRGRST and Not(DORESET)
```

Note that the signal SHFTERR used in the above equation is the SHFTERR signal generated by sequence logic unit 202 ORed with the motor overcurrent signal from motor overcurrent detector 210.

The four primary signals COCW, COCCW, SHFTDN and SHFTUP will now be described. The signal COCW is formed from the following Boolean equation:

```
COCW = (Not(SHN) and SH1 and SH2 and Not(CO34) and
        CO12 and CO5R and Not(ST5) and CL) or
       (Not(SHN) and SH1 and SH2 and Not(CO34) and
        CO12 and CO5R and Not(STR) and CL) or
       (Not(SHN) and SH1 and SH2 and Not(CO12) and
        CO34 and CO5R and 3THRUR and CL) or
       (Not(SHN) and SH1 and SH2 and CO34 and CO5R
        and CL and COCW) or
       (Not(SHN) and SH1 and SH2 and CO5R and
        Not(STR) and CL and Not(COCCW) or
       (Not(SHN) and SH1 and SH2 and CO5R and
        Not(ST5) and CL and Not(COCCW))
```

In accordance with the primary terms of the above equation, the angular motor assembly 114 is rotated to the right if (a) the drive link 118 is in neutral opposite third and fourth gears and fifth gear is selected, (b) the drive link 118 is in neutral opposite third and fourth gears and reverse is selected, or (c) the drive link 118 is in neutral opposite first and second gears and any gear from third, fourth, fifth or reverse gears is selected, in any event the clutch being disengaged. The secondary terms are employed to take care of the case in which the gear position is in neutral and possibly between limit switches 164, 166 and 168. The crossover clockwise signal COCW will continue to be generated if (d) the drive link 118 is in neutral and not opposite third and fourth gears or fifth and reverse gears and the signal COCW was previously generated; (e) the drive link 118 is in neutral and not opposite fifth and reverse gears, reverse gear is selected and the signal COCCW was not previously generated; or (f) the drive link 118 is in neutral and not opposite fifth and reverse gears, fifth gear is selected and the signal COCCW was not previously generated, in any event the clutch being disengaged. Note that these secondary terms keep the cross over motor assembly 114 running to reach the desired position even if none of the limit switches 164, 166 and 168 are actuated.

The signal COCCW is similarly formed according to the equation:

```
COCCW = (Not(SHN) and SH1 and SH2 and Not(CO34) and
         CO12 and CO5R and Not(ST1) and CL) or
        (Not(SHN) and SH1 and SH2 and Not(CO34) and
         CO12 and CO5R and Not(ST2) and CL) or
        (Not(SHN) and SH1 and SH2 and Not(CO5R) and
         CO12 and CO34 and 1THRU4 and ST5 and STR
         and CL) or
        (Not(SHN) and SH1 and SH2 and CO12 and CO34
         and CO5R and CL and COCCW)
        (Not(SHN) and SH1 and SH2 and CO12 and
```

-continued

```
Not(ST1) and CL and Not(COCW)) or
(Not(SHN) and SH1 and SH2 and CO12 and
Not(ST2) and CL and Not(COCW)) or
(Not(SHN) and SH1 and SH2 and CO12 and
CO34 and Not(ST3) and CL and Not(COCW)) or
(Not(SHN) and SH1 and SH2 and CO12 and
CO34 and Not(ST4) and CL and Not(COCW))
```

In accordance with the primary terms of the above equation the angular motor assembly 114 is rotated to the left when (a) the drive link 118 is in neutral and opposite third and fourth gears and first gear is selected, (b) the drive link 118 is in neutral and opposite third and fourth gears and second gear is selected, or (c) the drive link is in neutral and opposite fifth and reverse gears and any gear from first, second, third or fourth gears is selected, with the clutch being disengaged in any event. The secondary terms serve to continue the generation of the crossover counter clockwise signal COCCW if (d) the drive link 118 is in neutral, none of the limit switches 164, 166 and 168 is closed and the signal COCCW was previously generated; (e) the drive link 118 is in neutral and not opposite first and second gears, the desired gear is first gear and the signal COCW was not previously generated; (f) the drive link 118 is in neutral and not opposite first and second gears, the desired gear is second gear and the signal COCW was not previously generated; (g) the drive link 118 is in neutral and not opposite either first and second gears or third and fourth gears, third gear is selected and the signal COCW was not previously generated; or (h) the drive link 118 is in neutral and not opposite either first and second gears or third and fourth gears, fourth gear is selected and the signal COCW was not previously generated. These secondary terms assure that the signal COCCW continues to be generated until drive link 118 closes the limit switch 164, 166 or 168 corresponding to the desired gear. Note that the signals COCW and COCCW are only generated to control angular motor assembly 114 when limit switch 154 indicates the drive link 118 is in the neutral position (SHN). Since these movements take place in the neutral position no speed tests are necessary.

The signal SHFTDN is produced by the following Boolean equation:

```
SHFTDN = (Not(SH1) and SHN and SH2 and CL and
         PULLDOWN and GEAROK and Not(RETNEUT)
         and Not(ENDERR)) or
        (Not(SHN) and SH1 and SH2 and Not(CO12) and
         CL and Not(SPED2) and Not(ST2) and
         Not(RETNEUT) and Not(ENDERR)) or
        (Not(SHN) and SH1 and SH2 and Not(CO34) and
         CL and Not(SPED4) and Not(ST4) and
         Not(RETNEUT) and Not(ENDERR)) or
        (Not(SHN) and SH1 and SH2 and Not(CO5R)
         and CL and Not(SPEDR) and Not(STR) and
         Not(RETNEUT) and Not(ENDERR)) or
        (SHN and SH2 and CL and Not(RETNEUT) and
         Not(ENDERR) and SHFTDN) or
        (SH1 and SHN and SH2 and ST130R5 and
         RETNEUT and Not(SHFTUP)) or
        (SH1 and SHN and SH2 and HLDNEUT and
         Not(SHFTCOMP) and SHFTDN) or
        (SH1 and SHN and SH2 and CO5R and Not(STN)
         and RETNEUT and Not(SHFTUP))
```

In accordance with the primary terms the linear motor assembly 112 moves the drive link down if (a) the drive link 118 is in the upper limit and PULLDOWN is active, (b) the drive link 118 is in neutral opposite first and second gears and second gear is selected, (c) the drive link 118 is in neutral opposite third and fourth gears and fourth gear is selected, or (d) the drive link 118 is in neutral opposite fifth and reverse gears and reverse is selected, in any case the clutch being disengaged, the speed of the vehicle being proper for the selected gear, RETNEUT not being satisfied and ENDERR not generated, indicating that the time for completing the shift has not expired. The secondary terms insure the signal SHFTDN continues to be generated once started when the drive link 118 is between the limit switches. Thus the signal SHFTDN is generated if; (e) the drive link 118 is neither in neutral nor at the bottom limit, the signal SHFTDN was previously generated, the clutch is disengaged, RETNEUT not being satisfied and ENDERR not generated; (f) the drive link 118 is in a position between limit switches 152, 154 and 156, the requested gear being first, third or fifth gears, the signal SHFTUP was not previously generated, RETNEUT being satisfied; (g) the drive link 118 is in a position not tripping either of limit switches 152 or 156, the shift is not complete, HLDNEUT is satisfied and the signal SHFTDN was previously generated; or (h) the drive link 118 is in a position between limit switches 152, 154 and 156 and not opposite the fifth and reverse gears, neutral gear being selected, RETNEUT being satisfied and the signal SHFTUP was not previously generated.

Lastly, the signal SHFTUP is formed by the following equation:

```
SHFTUP = (Not(SH2) and SH1 and SHN and Not(CO12) and
         CL and GEAROK and ST2 and Not(RETNEUT)
         and Not(ENDERR)) or
        (Not(SH2) and SH1 and SHN and Not(CO34) and
         CL and GEAROK and ST4 and Not(RETNEUT)
         and Not(ENDERR)) or
        (Not(SH2) and SH1 and SHN and Not(CO5R)
         and CL and GEAROK and STR and
         Not(RETNEUT) and Not(ENDERR)) or
        (Not(SHN) and SH1 and SH2 and Not(CO12) and
         CL and Not(SPED1) and Not(ST1) and
         Not(RETNEUT) and Not(ENDERR)) or
        (Not(SHN) and SH1 and SH2 and Not(CO34) and
         CL and Not(SPED3) and Not(ST3) and
         Not(RETNEUT) and Not(ENDERR)) or
        (Not(SHN) and SH1 and SH2 and Not(CO5R) and
         CL and Not(ST5) and Not(RETNEUT) and
         Not(ENDERR)) or
        (SH1 and SHN and CL and SHFTUP and
         Not(RETNEUT) and Not(ENDERR)) or
        (SH1 and SHN and SH2 and ST24ORR and
         RETNEUT and Not(SHFTDN)) or
        (SH1 and SHN and SH2 and HLDNEUT and
         Not(SHFTCOMP) and SHFTUP) or
        (SH1 and SHN and SH2 and Not(CO5R) and
         Not(STN) and RETNEUT and Not(SHFTDN))
```

Thus the linear motor assembly 112 moves the drive link up if (a) the drive link 118 is in second gear and second gear is not selected, (b) the drive link 118 as in fourth gear and fourth gear is not selected, (c) the drive link 118 is in reverse gear and reverse gear is not selected, (d) the drive link 118 is in neutral opposite first and second gears and first gear is selected, (e) the drive link 118 is in neutral opposite third and fourth gears and third gear is selected, or (f) the drive link 118 is in neutral opposite fifth and reverse gears and fifth gear is selected, in any case the clutch being disengaged, the speed of the vehicle being proper for the selected gear and RETNEUT not being satisfied. The secondary terms provide for the continuation of the signal SHFTUP while drive link 118 is between limit switches 158, 160 and 162. The signal SHFTUP is generated when: (g) the drive link 118 is not in neutral or the upper limit, the signal SHFTUP was previously generated, the clutch is disengaged, RETNEUT not being satisfied and ENDERR not being satisfied; (h) the drive link 118 is in a position not tripping any of limit switches 152, 154 or 156, the desired gear is second, fourth or reverse gear, the signal SHFTDN was not previously generated, and RETNEUT is satisfied; (i) the drive link 118 is in a position not tripping any of limit switches 152, 154 or 156, the shift is not complete, HLDNEUT is satisfied and the signal SHFTUP was previously generated; and (j) the drive link 118 is in a position not tripping any of limit switches 152, 154 or 156 and opposite fifth and neutral gears, neutral gear was selected, RETNEUT is satisfied and SHFTDN was not previously generated.

Sequence logic unit 202 generates the SHFTCOMP signal. This signal is applied to the trigger input of a one shot circuit. 212. One shot circuit 212 in turn drives shift complete lamp 100. When SHFTCOMP is generated one shot circuit 212 drives shift complete lamp 100 for a Predetermined period of -time in the order of a few seconds and then extinguishes lamp 100. In the event that a new desired gear which differs from the present gear is selected, SHFTCOMP is no longer generated. One shot circuit 212 recognizes this change of state and immediately extinguishes lamp 100 in the case in which the predetermined period cf time has not yet passed. Thus shift complete lamp 100 is illuminated for a certain time to indicate that the last requested gear has been reached.

Signal logic unit 204 provides additional signal conditioning logic to the four primary signals COCCW, COCW, SHFTDN and SHFTUP produced by sequence logic unit 202. Signal logic unit 204 generates four signals: FCOCCW and FCOCW which are supplied to the first motor driver 206; and FSHFTDN and FSHFTUP which are supplied to second motor driver 208. These signals provide the necessary control for angular motor assembly 114 and linear motor assembly 112, respectively. To perform these functions, signal logic unit 204 receives the above noted primary signals from sequency logic unit 202 plus the signals SHFTCOMP, SHFTTOR and SHFTERR.

Signal logic unit 204 primarily provides additional lockout functions and a time out function to stop the motors if the drive link 118 has not reached the selected gear within a predetermined period of time. To achieve these functions signal logic unit 204 generates two intermediate signals: ONESTRT and INVALSHF. The signal ONESTRT is employed to start one shot device 214. This signal is formed as follows:

---

ONESTRT = (COCW and Not(ONESTRT) and Not(ONEEND))
or (COCCW and Not(ONESTRT) and Not(ONEEND))
or (SHFTDN and Not(ONESTRT) and Not(ONEEND))
or (SHFTUP and Not(ONESTRT) and Not(ONEEND))

---

Thus the one shot device 214 is triggered upon receipt of one of the primary signals from sequence logic unit 202, when ONESTRT was not previously generated and when ONEEND is not generated. The signal ONEEND is generated by one shot device 214 for a predetermined period of time after one shot device 214 is triggered by ONESTRT. The predetermined time of one shot device 214 is selected to be longer than the longest expected interval required to perform a desired shift of the transmission. One shot device 214 causes ONEEND to be active for the predetermined period of time and then it returns to its inactive state. As a result, the signal ONEEND is active for the predetermined period of time after first receipt of one of the primary signals generated by sequence logic unit 202. One shot device 214 is also controlled by one shot device 216. When sequence logic unit 202 generates the DORESET signal, indicating the the shift operation is being reset because the vehicle speed as too great for the selected gear, one shot device 216 is triggered. This applies a signal to the reset input of one shot device 214 for a predetermined period of time. As a consequence, ONEEND cannot be valid until the expiration of the predetermined period of time of one shot device 216. This process prevents generation of any of the drive signals during this reset process.

The signal INVALSHF is employed in the generation of the four drive signals FCOCW, FCOCCW, SHFTDN and SHFTUP. This signal is formed as follows:

---

INVALSHF = (COCW and FCOCW and Not(ONEEND))
or COCCW and FCOCCW and Not(ONEEND))
or (SHFTDN and FSHFTDN and Not(ONEEND))
or (SHFTUP and FSHFTUP and Not(ONEEND))
or SHFTERR or (INVALSHF and ONEEND)

---

This signal INVALSHF indicates that a time out or error condition has occurred. The first four terms indicate that the simultaneous generation of one of the primary signals and its counterpart drive signal after the signal ONEEND has returned to its innactive state is an invalid shift operation. The signal INVALSHF is employed to end the drive signals, regardless of the continued generation of the primary signal i the time of one shot device 214 has expired. An invalid shift operation also occurs if SHFTERR is received from sequence logic unit 202. The last term retains INVALSHF even if ONEEND becomes valid during INVALSHF. This requires INVALSHF to be reset prior to the start of another shift operation even if ONEEND is restarted.

The four drive signals FCOCW, FCOCCW, FSHFTDN and FSHFTUP are generated by signal logic circuit 204. The signal FCOCW is generated as follows:

---

FCOCW = (COCW and Not(INVALSHF) and Not(SHFTCOMP) and ONEEND) or (COCCW and Not(FCOCCW) and INVALSHF)

---

Thus the drive signal FCOCW is generated if: (a) its counterpart primary signal COCW are received from sequence logic unit 202 and neither INVALSHF nor SHFTCOMP is generated during the predetermined period of ONEEND; or (b) the signal COCCW is received from sequence logic unit 202 is received, the counter part drive signal FCOCCW is not generated and INVALSHF is active. The drive signal FCOCCW is similarly generated as follows:

```
FCOCCW = (COCCW and Not(INVALSHF) and
         Not(SHFTCOMP) and ONEEND) or
         (COCW and Not(FCOCW) and INVALSHF)
```

The drive signal FSHFTDN is generated as follows:

```
FSHFTDN = SHFTDN and Not(SHFTTOR) and
          NOT(INVALSHF) and NOT(SHFTCOMP)
          and ONEEND)
       or (SHFTDN and SHFTTOR and NOT(RCLKR)
          and NOT(INVALSHF) and
          NOT(SHFTCOMP) and ONEEND)
```

The signal FSHFTDN is generated in two differing cases. If the selected gear is not reverse, then FSHFTDN is generated if its counterpart primary signal SHFTDN is received from sequence logic unit 202 and neither INVALSHF nor SHFTCOMP are generated during the predetermined period of ONEEND. On the other hand, if the selected gear was reverse gear, then all these conditions must be met and, in addition, the signal RCLKR must be active. In accordance with the preferred embodiment of the present invention, it is desirable to shift into reverse gear with a slower rate of travel of drive link 118 than when shifting into other gears. This slow rate of travel of drive link 118 is desirable to enable better meshing of the gears in that case that manual transmission assembly 14 does not have a synchronized reverse gear. This slower rate of travel is achieved by ANDing the signals for generation of the drive signal with NOT(RCLKR) for the case that reverse gear is selected. The signal RCLKR is preferrably a square wave an oscillating signal having a duty cycle of about 50% in the preferred embodiment. This duty cycle can be selected to provide the desired reduction in speed. It is also possible to provide such a speed reduction for any other gear which is not synchronized, such as first gear. Lastly, the drive signal FSHFTUP is formed as follows:

```
FSHFTUP=(SHFTUP and NOT(INVALSHF)
         and NOT(SHFTCOMP) and ONEEND )
```

This equation is similar to the primary term for generation of FSHFTDN with the exception of the test for reverse gear.

The four primary signals COCW, COCCW, SHFTDN and SHFTUP cooperate to provide the sequence of motions to provide the requested gear. Because motion of the drive link 118 changes the position signals SH1, SHN, SH2, CO12, CO34 and CO5R, the four Boolean equations listed above for generation of these signals provide control to reach the desired gear. Signal logic unit 204 serves to provide a time out function, additional lock out functions and the reduction in speed of travel of drive link 118 when shifting into reverse gear.

The signal logic unit 202 drives the invalid shift lamp 98. When an invalid shift operation is detected, then the INVALSHF signal is active. This signal as supplied to buffer/inverter 213 which drives invalid shift lamp 98. Thus invalid shift lamp 98 is illuminated to indicate to the operator that the desired shift is inappropriate and will not be carried out. For example, selection of a gear that would over rev the engine would be prohibited and the fact that the operator has selected such an inappropriate gear would be indicated by illumination of invalid shift lamp 98.

Figure 10:
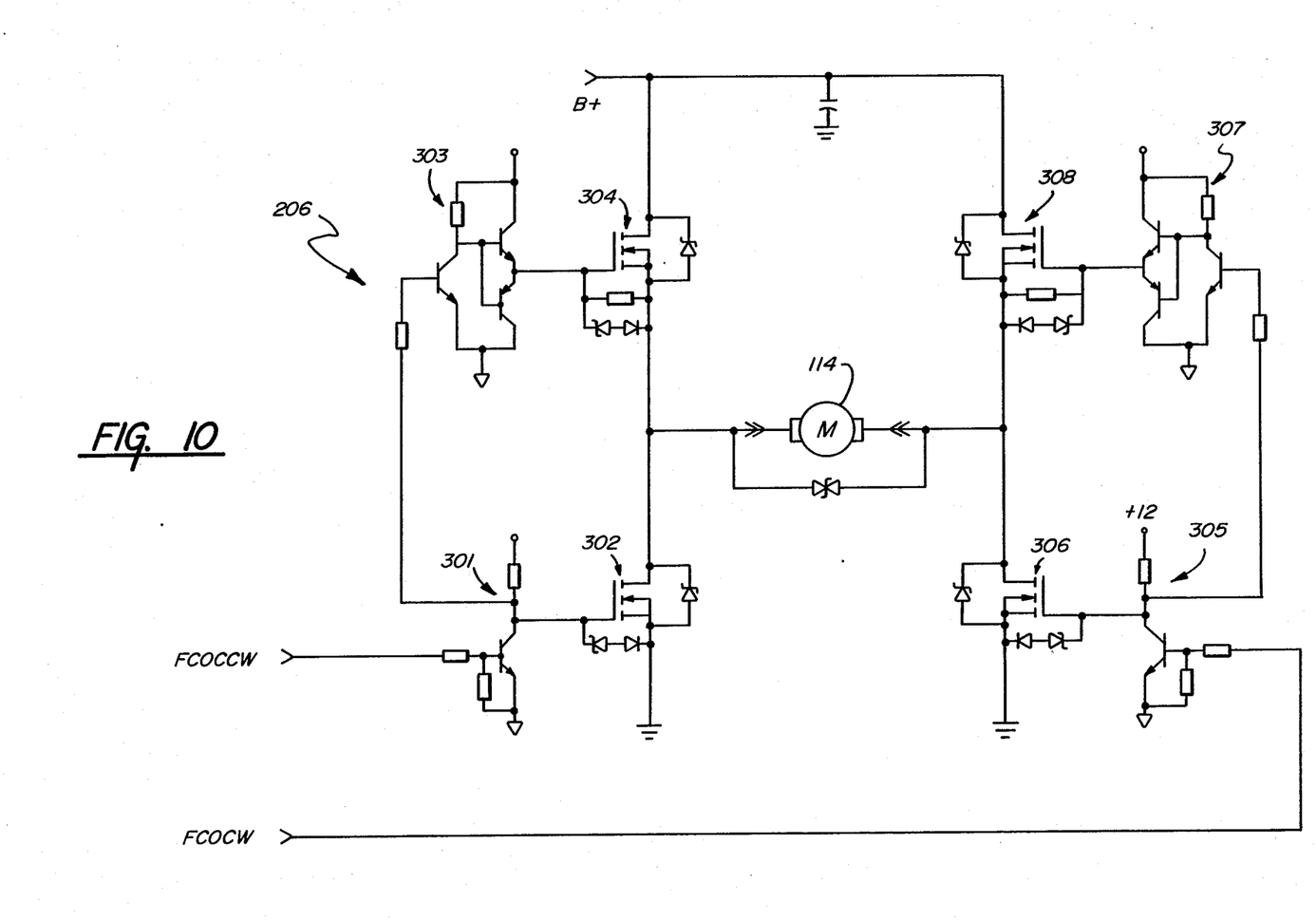
FIG. 10 is a detailed schematic diagram of an example of one of the motor drive circuits.

First motor driver circuit 206 is illustrated in detailed in FIG. 10. The counter-clockwise motor drive signal FCOCCW is applied to inverter 301. The output of inverter 301 as applied to switch device 302 and to inverter 303. The output of inverter 303 :s applied to switch device 304. Thus switch device 302 and switch device 304 are kept in the opposite states. In a similar manner the clockwise motor drive signal FCOCW is applied to the input of inverter 305. The output of inverter 305 is supplied to switch device 306. The output of inverter 305 is also supplied to the input of inverter 307, which supplies the input to switch device 308. Switch devices 306 and 308 are also kept in the opposite states. Moor 114 is connected in a bridge circuit between switch devices 302, 304, 306 and 308.

The first motor driver 206 operates as follows. When neither drive signals FCOCCW or FCOCW are active, then switch devices 302 and 306 are on and switch devices 304 and 308 are off. This applies the same potential to both terminals of angular motor assembly 114. This serves to dynamically brake the motor. Upon generation of the counter-clockwise motor drive signal FCOCCW switch device 304 is actuated while switch device 302 is are deactuated. This causes flow of current through motor 114 in its first direction via switch devices 304 and 306. Switch device 306 remained on because the signal FCOCW is not active. When FCOCCW returns to its inactive state, such as when a shift :s complete, then switch device 302 is activated and switch device 304 is deactivated. This returns motor 114 to a dynamic braking state. Upon generation of the clockwise motor drive signal FCOCW switch devices 306 is deactivated and switch device 308 is activated. This permits flow of current through motor 114 in the opposite direction, via switch device 308 and the still actuated switch device 302. When the signals FCOCW returns to the inactive state, switch device 306 is activated and switch device 308 s deactivated. This returns motor 114 to the dynamic braking state. Thus motor 114 is controlled to rotate clockwise or counter-clockwise in accordance with the signal supplied from logic control unit 202 and :s dynamically braked when neither the counter-clockwise motor drive signal FCOCCW nor the clockwise motor drive signal FCOCW is generated. Second motor driver circuit 208 :s similarly constructed for control of motor 112.

The invention electric shift apparatus will be seen to have many advantages. Specifically, the modular assemblies minimize components and inventory requirements; the ease of assembly of the modules minimizes assembly plant labor; the control and power modules may be pretested prior to delivery to the vehicle manufacturer with consequent improvements in reliability and warranty costs; and in general, the invention electric shift apparatus retains the low initial cost and superior mileage advantages of a manual transmission while eliminating the requirement to actually physically shift the gears.

Whereas a preferred embodiment of the invention has been illustrated and described in detail it will be apparent that various changes may be made in the disclosed embodiment without departing from the spirit or scope of the invention.

We claim:

1. An electrical control apparatus for control of a manual transmission apparatus in a motor vehicle having a plurality of transmission states selected by the position of a shift select lever, said electrical control apparatus comprising:

a first electric motor;

means drive by said first electric motor and operative in response to energization of said first electric motor to move said shift select lever laterally between left, center, and right locations;

a second electric motor;

means driven by said second electric motor and operative in response to energization of said second electric motor to move said shift select lever longitudinally between forward, neutral, and rearward locations;

operator input means operative to generate a desired transmission state signal corresponding to manual operator input;

a first transmission state sensing means for indicating the left, center or right location of the shift select lever;

a second transmission state sensing means for indicating the forward, neutral or rearward location of the shift select lever;

a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal; and a motor drive means connected to said logic control unit and adapted for connection to the first and second electric motors for controlling the first electric motor for movement of said shift select lever in one lateral direction in response to said clockwise motor drive signal, controlling the first electric motor for movement of said shift select lever in the opposite lateral direction in response to said counter-clockwise motor drive signal, controlling the second electric motor for movement of said shift select lever in one longitudinal direction in response to said shift up motor drive signal, and controlling the second electric motor for movement of said shift select lever in the opposite longitudinal direction in response to said shift down motor drive signal.

2. The electrical control apparatus for control of a manual transmission apparatus as claimed in claim 1, further comprising:

a vehicle condition sensing means for generating a plurality of vehicle condition signals, each vehicle condition signal corresponding to an operational condition of the motor vehicle;

said logic control unit includes a shift inhibition means for inhibiting the generation of any of said motor drive signals when said desired transmission state signal and said vehicle condition signals correspond to one of a set of unsafe circumstances.

3. The electrical control apparatus for control of a manual transmission apparatus as claimed in claim 2, wherein the manual transmission includes a neutral transmission state and a clutch for disengaging the engine from the manual transmission via a clutch pedal said vehicle condition sensing means includes a clutch pedal depression sensing means coupled to the clutch pedal for generating a clutch signal indicative of the depression of the clutch pedal; and said shift inhibition means inhibits the initial generation of any of said motor drive signals when said clutch signal indicates the clutch pedal is not depressed and said desired transmission state differs from said present transmission state.

4. An electrical control apparatus for control of a manual transmission apparatus in a motor vehicle having a plurality of transmission states selected by the position of a shift select lever, a first motor adapted for clockwise and counter-clockwise motion for the shift select lever and a second motor adapted for forward and rearward motion of the shift select lever, said electrical control apparatus comprising:

an operator input means for generating a desired transmission state signal corresponding to manual operator input;

a first transmission state sensing means for indicating the left, center or right location of the shift select lever;

a second transmission state sensing means for indicating the forward, neutral or rearward location of the shift select lever;

a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal;

a motor drive means connected to said logic control unit and adapted for connection to the first and second motors for controlling the first motor for clockwise motion in response to said clockwise motor drive signal, controlling the first motor for counter-clockwise motion in response to said counter-clockwise motor drive signal, controlling the second motor for forward motion in response to said shift up motor drive signal, and controlling the second motor for rearward motion in response to said shift down motor drive signal; and vehicle condition sensing means for generating a plurality of vehicle condition signals, each vehicle condition signal corresponding to an operational condition of the motor vehicle;

said logic control unit including a shift inhibition means for inhibiting the generation of any of said motor drive signals when said desired transmission state signal and said vehicle condition signals correspond to one of a set of unsafe circumstances;

said vehicle condition sensing means including a speed sensing means for generating at least one vehicle speed signal indicative of the speed of the motor vehicle;

said shift inhibition means inhibiting the generation of any of said motor drive signals when said at least one vehicle speed signal indicates a motor vehicle speed greater than a predetermined motor vehicle speed corresponding to said desired transmission state signal.

5. The electrical control apparatus for control of a manual transmission apparatus as claimed in claim 4, wherein the manual transmission includes the transmission states of a reverse gear, and a plurality of forward gears:

said speed sensing means generates a reverse speed limit signal when the speed of the motor vehicle exceeds a first predetermined speed, and a plurality of forward speed limit signals, each forward speed limit signal generated when the speed of the motor vehicle exceeds said a corresponding predetermined speed, said corresponding predetermined speed being greater than said first predetermined speed and said predetermined speed corresponding a prior forward speed limit signal, the number of said forward speed limit signals being one less than the number of forward gears;

said shift inhibition means inhibits the generation of any of said motor drive signals when
said desired transmission state signal is the reverse gear and said reverse speed limit signal is received, or
said desired transmission state signal is one said plurality of said forward gears and the corresponding one of said plurality of forward speed limit signals is received, the highest forward gear having no corresponding forward speed limit signal.

6. The electrical control apparatus for control of a manual transmission apparatus as claimed in claim 5, wherein:

said speed sensing receives a analog speed signal indicative of motor vehicle speed and includes
a first comparitor for generating said reverse speed limit signal when said analog speed signal exceeds a first threshold level,
a-plurality of second comparitors for generating said plurality of forward speed limit signals when said analog speed signal exceeds a corresponding second threshold level, higher than said first threshold level and higher than the prior second threshold level.

7. An electrical control apparatus for control of a manual transmission apparatus in a motor vehicle having a plurality of transmission states selected by the position of a shift select lever, a first motor adapted for clockwise and counter-clockwise motion for the shift select lever and a second motor adapted for forward and rearward motion of the shift select lever, said electrical control apparatus comprising:

an operator input means for generating a desired transmission state signal corresponding to manual operator input;
a first transmission state sensing means for indicating the left, center or right location of the shift select lever;
a second transmission state sensing means for indicating the forward, neutral or rearward location of the shift select lever;
a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal; and
a motor drive means connected to said logic control unit and adapted for connection to the first and second motors for
controlling the first motor for clockwise motion in response to said clockwise motor drive signal,
controlling the first motor for counter-clockwise motion in response to said counter-clockwise motor drive signal, controlling the second motor for forward motion in response to said shift up motor drive signal, and
controlling the second motor for rearward motion in response to said shift down motor drive signal;
said logic control unit further including speed reduction means for controlling the second motor for motion at a reduced speed when said desired transmission state is a predetermined transmission state.

8. The electrical control apparatus for control of a manual transmission apparatus as claimed in claim 7, wherein:

the manual transmission includes the transmission states of a neutral gear and a plurality of operating gears, each of said operating gears being reachable from said neutral gear via motion of said second motor; and
said speed reduction means includes means for generating an square wave oscillating signal having a predetermined duty cycle and for ANDing said oscillating signal with a selected one of said shift up motor drive signal and said shift down motor drive signal for controlling the second motor for motion at a reduced speed when moving from said neutral gear to said reverse gear, said predetermined duty cycle selected to reduce the motion of the shift select lever to the desired degree.

9. The electrical control apparatus for control of a manual transmission apparatus as claimed in claim 11, wherein:

said operating gears of the manual transmission includes reverse gear and said predetermined transmission state is reverse gear;
said reverse gear is reached from said neutral gear by a rearward motion of the shift select lever; and
said oscillating signal is ANDed with said shift down drive signal when moving between said neutral gear and said reverse gear.

10. An electrical control apparatus for control of a manual transmission apparatus in a motor vehicle having a plurality of transmission states selected by the position of a shift select lever, said electrical control apparatus comprising:

a first electric motor;
means driven by said first electric motor and operative in response to energization of said motor to move said shift select lever laterally between left, center, and right locations;
a second electric motor;
means driven by said second electric motor and operative in response to energization of said second electric motor to move said shift select lever longitudinally between forward, neutral, and rearward locations;

an operator input means for generating a desired transmission state signal corresponding to manual operator input;

a first transmission state sensing means for indicating the left, center or right location of the shift select lever;

a second transmission state sensing means for indicating the forward, neutral or rearward location of the shift select lever; and a logic control unit connected to the first and second electric motors, said operator input means, and said first and second transmission state sensing means for generation of a sequence of motor drive signals for control of the first and second electric motors corresponding to the sequence of lateral and longitudinal motions required for movement of the shift select lever from the present transmission state to the desired transmission state when said desired transmission state differs from said present transmission state.

11. An electrical control apparatus for control of a manual transmission apparatus in a motor vehicle having a plurality of transmission states selected by the position of a shift select lever, a first motor adapted for clockwise and counter-clockwise motion for the shift select lever and a second motor adapted for forward and rearward motion of the shift select lever, said electrical control apparatus comprising:

an operator input means for generating a desired transmission state signal corresponding to manual operator input;

a first transmission state sensing means for indicating the left, center or right location of the shift select lever;

a second transmission state sensing means for indicating the forward, neutral or rearward location of the shift select lever;

a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal;

a motor drive means connected to said logic control unit and adapted for connection to the first and second motors for controlling the first motor for clockwise motion in response to said clockwise motor drive signal, controlling the first motor for counter-clockwise motion in response to said counter-clockwise motor drive signal, controlling the second motor for forward motion in response to said shift up motor drive signal, and controlling the second motor for rearward motion in response to said shift down motor drive signal; and vehicle condition sensing means for generating a plurality of vehicle condition signals, each vehicle condition signal corresponding to an operational condition of the motor vehicle;

said logic control unit including a shift inhibition means for inhibiting the generation of any of said motor drive signals when said desired transmission state signal and said vehicle condition signals correspond to one of a set of unsafe circumstances;

said manual transmission including a neutral transmission state and a clutch for disengaging the engine from the manual transmission by a clutch pedal;

said vehicle condition sensing means including a clutch pedal depression sensing means coupled to the clutch pedal for generating a clutch signal indicative of the depression of the clutch pedal;

said shift inhibition means inhibiting the initial generation of any of said motor drive signals when said clutch signal indicates the clutch pedal is not depressed and said desired transmission state differs from said present transmission state;

said shift inhibition means further including means for generation of a sequence of motor drive signals for movement of the shift select lever into the neutral transmission state during generation of any motor drive signal if the clutch is not depressed.

12. An electrical control apparatus for control of a manual transmission apparatus in a motor vehicle having a plurality of transmission states selected by the position of a shift select lever, a first motor adapted for clockwise and counter-clockwise motion for the shift select lever and a second motor adapted for forward and rearward motion of the shift select lever, said electrical control apparatus comprising:

an operator input means for generating a desired transmission state signal corresponding to manual operator input;

a first transmission state sensing means for indicating the left, center or right location of the shift select lever;

a second transmission state sensing means for indicating the forward, neutral or rearward location of the shift select lever;

a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal; and a motor drive means connected to said logic control unit and adapted for connection to the first and second motors for controlling the first motor for clockwise motion in response to said clockwise motor drive signal, controlling the first motor for counter-clockwise motion in response to said counter-clockwise motor drive signal, controlling the second motor for forward motion in response to said shift up motor drive signal, and controlling the second motor for rearward motion in response to said shift down motor drive signal;

said first transmission state sensing means including a first microswitch for indicating the left location of the shift select lever;

a second microswitch for indicating the center location of the shift select lever;

a third microswitch for indicating the right location of the shift select lever, said shift select lever being capable of being in a position where none of said first, second or third microswitches is actuated; said second transmission state sensing means including a fourth microswitch for indicating the forward location of the shift select lever; a fifth microswitch for indicating the neutral location of the shift select lever; a sixth microswitch for indicating the rearward location of the shift select lever, said shift select lever being capable of being in a position where none of said fourth, fifth or sixth microswitches is actuated; said logic control unit including feedback means for continuing the generation of a motor drive signal upon initial generation of one of said motor drive signals and movement of the shift select lever to a position where none of said first, second or third microswitches is actuated or to a position where none of said fourth, fifth or sixth microswitches is actuated.

13. An electrical control apparatus for control of a manual transmission apparatus in a motor vehicle having a plurality of transmission states selected by the position of a shift select lever, a first motor adapted for clockwise and counter-clockwise motion for the shift select lever and a second motor adapted for forward and rearward motion of the shift select lever, said electrical control apparatus comprising:

an operator input means for generating a desired transmission state signal corresponding to manual operator input;

a first transmission state sensing means for indicating the left, center or right location of the shift select lever;

a second transmission state sensing means for indicating the forward, neutral or rearward location of the shift select lever;

a logic control unit connected to said operator input means and said first and second transmission state sensing means for generation of a sequence of motor drive signals corresponding to the sequence of motions required for movement of the shift select lever from the present transmission state to the desired transmission state when said desired transmission state differs from said present transmission state, said motor drive signals including a clockwise motor drive signal, a counter-clockwise motor drive signal, a shift up motor drive signal and a shift down motor drive signal; and a motor drive means connected to said logic control unit and adapted for connection to the first and second motors for
controlling the first motor for clockwise motion in response to said clockwise motor drive signal,
controlling the first motor for counter-clockwise motion in response to said counter-clockwise motor drive signal, controlling the second motor for forward motion in response to said shift up motor drive signal, and controlling the second motor for rearward motion in response to said shift down motor drive signal;

said logic control unit including a timer means for inhibiting the generation of said motor drive signals if the desired transmission state signal differs from said present transmission state signal for more than a predetermined period of time.

14. An electric shift apparatus for controlling a manual transmission having a plurality of shift components selectably movable to provide a plurality of forward speed positions and a neutral position, said apparatus comprising:

A a control assembly, including a gear selector assembly adapted to be positioned in the passenger compartment of the vehicle and including gear selector means having respective select positions corresponding to each position of the transmission, operative in response to operator selection to generate a plurality of electrical control signals respectively corresponding to each position of the transmission; and B an electrical power module adapted to be secured to the housing of the transmission and including first and second electric motors energized in response to receipt of each of said control signals in a sense to impart a specific combination and sequence of angular and axial movements to said shift components to move the transmission respectively to the transmission position corresponding to the received control signal.

* * * * *